Dec. 26, 1939.　　　　　K. L. WOODMAN　　　　　2,184,828
COOKING SURFACE AND METHOD OF TREATING THE SAME
Filed May 21, 1938
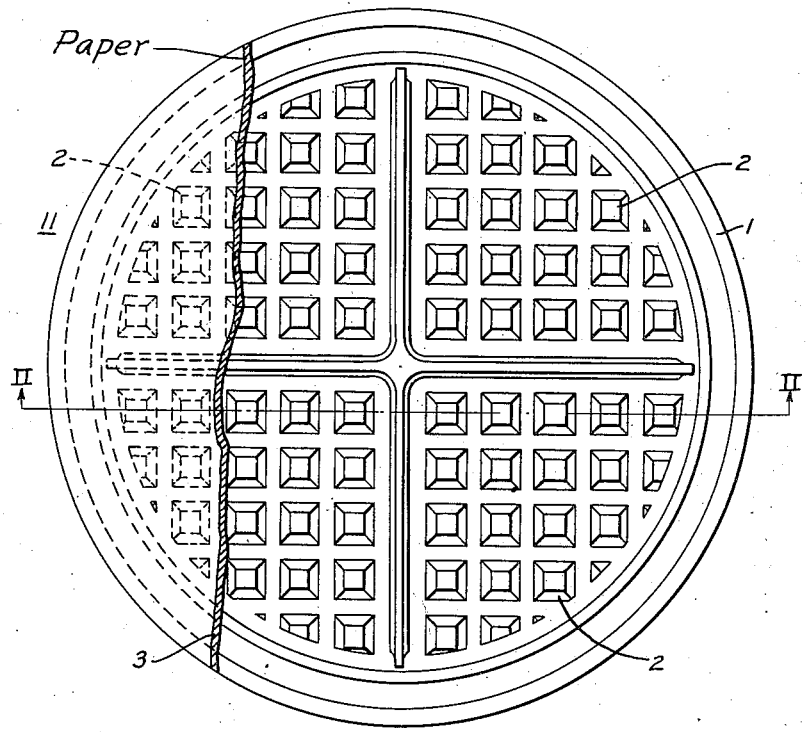
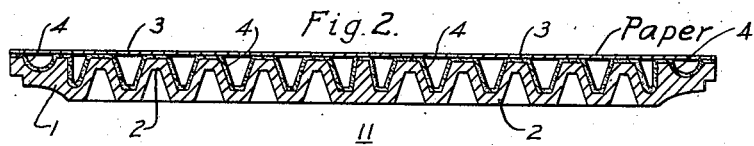
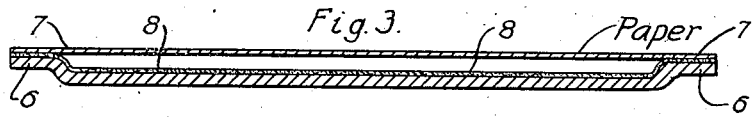
WITNESSES:
INVENTOR
Kenneth L. Woodman.
BY
ATTORNEY Patented Dec. 26, 1939

2,184,828

UNITED STATES PATENT OFFICE 2,184,828

COOKING SURFACE AND METHOD OF TREATING THE SAME

Kenneth L. Woodman, Mansfield, Ohio, assignor to Westinghouse Electric & Manufacturing Company, East Pittsburgh, Pa., a corporation of Pennsylvania Application May 21, 1938, Serial No. 209,391

3 Claims. (Cl. 53—10)

My invention relates to cooking surfaces, and more particularly to the treating of such surfaces and to the protection thereof from contamination.

This application is a continuation-in-part of my application Serial 125,596, filed Feb. 13, 1937 and assigned to Westinghouse Electric & Manufacturing Company.

The cooking surfaces of waffle irons, sandwich grills and the like, known to the art, require special conditioning or treating so that the finished cooked product will not stick thereto. While this conditioning has been done at home, most operators have had trouble in properly treating the cooking surface so that the finished product will not stick.

Various methods, including vegetable or animal oils or fats, have been used at the factory in an attempt to pre-condition such cooking surfaces, but none of these methods have been satisfactory even though they readily temporarily condition the surfaces since the oil or fat used became rancid in a short time. It is, therefore, an object of my invention to provide means for conditioning the cooking surfaces of waffle irons, sandwich grills and the like which will not become rancid or otherwise unsatisfactory with age and which may be applied to such surfaces at the factory.

A further object of my invention is to provide means for preventing the cooking surfaces of waffle irons, sandwich grills, or the like, as well as any conditioning material on such surfaces, from becoming contaminated.

Other objects of my invention will either be pointed out specifically in the course of the following description of a device embodying my invention, or will be apparent from such description.

In the accompanying single sheet of drawings:

Figure 1 is a plan view of a device embodying my invention;

Fig. 2 is a sectional view of such device taken along line II—II of Fig. 1; and

Fig. 3 is a partial sectional view of an additional device embodying my invention.

Referring to Figure 1, I show a waffle iron 11 having a frame 1 and a plurality of grids 2, which may be of a well-known type. A suitable greasy, oily, waxy or wax-like substance such as carnauba wax, montan wax, beeswax or paraffin, is placed over the grids 2 and the outer portion of the frame 1 to condition the cooking surface. It is preferred that the conditioning material 4 be a hard and tough solid at ordinary room temperature, and that it will melt or be plastic at a temperature slightly lower than the cooking temperature of the cooking surface or grids 2. The preferred carnauba wax will melt at substantially 160° F.

By having the conditioning material 4 in the form of a wax or a solid at room temperature, it is possible to have the said conditioning material placed upon the waffle iron or the like at the factory. If the preferred carnauba wax is used, such wax may be dissolved in hot toluol and the resultant liquid sprayed on the cooking surfaces. The toluol will then evaporate leaving a thin deposit of the wax. Due to the conditioning material 4 being a solid at ordinary room temperatures, it is possible for such material to remain upon the cooking surface for any length of time desired, without becoming rancid, in contrast to a liquid vegetable or animal fat.

A suitable protective covering 3 may be placed over the grids 2 and the frame 1 to prevent the cooking surface of said iron from becoming contaminated between the time of manufacturing and the first use thereof. The protective covering 3 may be of any fibrous or cellulose product desired. However, it is preferred that such protective covering be either a sheet of treated paper or Cellophane. This protective covering may be placed over the waffle iron or the like at the factory shortly after the conditioning material 4 has been placed upon the iron. By placing the protective covering 3 over the waffle iron immediately after the conditioning material has been placed thereon, the conditioning material acts as a bond between such protective covering and the waffle iron. It is, therefore, obvious that the conditioning material operates in a dual capacity; namely, holding the protecting cover 3 in place upon the waffle iron 11, and after the protecting covering 3 has been removed, the conditioning of the waffle iron after the cooking surface thereof has been brought to the cooking temperature.

Fig. 3 illustrates a sectional view of a sandwich grill or the like and shows the relative position of the grill or frame 6, the conditioning material 8 preferably carnauba wax, and the protective material 7. The conditioning material 8 may likewise be placed upon the grill surface at the factory substantially as hereinabove described, after which the protective covering 7 may be placed thereupon. The conditioning material 8 likewise may perform a dual function in acting as a bond between the protective covering 7 and the frame 6, and in conditioning the cooking surface 6 after said grill has been brought to a cooking temperature.

It is, therefore, obvious that it is immaterial as to what type of cooking surface the conditioning material is placed upon, and that it will remain on such surface until such surface has been brought to a cooking temperature, at which time the conditioning material will treat and condition the said cooking surface and thus prevent the material that is placed upon such surface from sticking thereto. It is, likewise obvious that the protective material may also be placed over any type of a cooking surface, merely by using the conditioning material as a bond, and that such protective material will then protect the cooking surface and the conditioning material from contamination between the time it was placed upon such surface and the time when it becomes necessary to remove such protective material to permit the use of such cooking surface.

In operating a waffle iron, a sandwich grill or the like, having a coating of treating or conditioning material and a covering of protective material placed thereon, the operator merely removes the protective material and then applies the necessary heat to such cooking surface. As the cooking surface increases in temperature and approaches the cooking temperature, the waxy conditioning material will melt and return to a liquid state. In such a state the conditioning material will retreat or further impregnate the cooking surface and prevent the cooked material from sticking thereto. In some cases the first batch or material to be cooked, when placed upon such cooking surface, will absorb any excess conditioning material. As this first batch of cooked material is removed from the cooking surface, the excess conditioning material is likewise removed therefrom, whereupon the cooking surface is left in the proper condition for repeated cooking thereafter without any sticking taking place. If desired, the first waffle or other material cooked on the treated apparatus may be thrown away as containing an excess of such conditioning material. However, it should be understood that such absorption of material by the first material to be cooked is not an essential part of my present invention, which is not so limited. The constituency of the oily or greasy coating material may be such as to render the first batch of material satisfactorily edible.

It will thus be understood that my conditioning material will pre-condition the cooking surface while being placed upon such surface, thereby eliminating the necessity of treating the cooking surfaces at the home of the operator before using them. This factory pre-treatment ensures a more accurate control over the process which eliminates the danger of cooked material sticking to the cooking surface because of any faulty home treatment thereof.

It is to be further understood that it is possible to seal the protective covering to the waffle iron, or the like, by any desired bonding material such as a thin rubber cement.

It is, therefore, obvious that by coating the cooking surface of waffle irons, sandwich grills or the like with a waxy, oily or greasy treating or conditioning material and then covering such material with a suitable protective covering, the cooking surface and the conditioning coating will be protected from contamination until the purchaser of such device desires to cook thereon. It is also obvious that the conditioning material which may act as a bond for the protective material will treat or condition the cooking surface and prevent the material to be cooked thereon from sticking thereto.

It is obvious that my invention may be applied to any type of cooking surface and that various modifications may be made therein without departing from the spirit and scope of my invention. I desire, therefore, that only such limitations shall be placed thereon as are imposed by the prior art and the appended claims.

I claim as my invention.

1. In the manufacture of a cooking appliance having a metallic surface for directly contacting food to be cooked, the process of treating the cooking surface to afford many repeated separations of the food therefrom without adhesion to the cooking surface, which process includes the application to said cooking surface of heated material in liquefied form and including a carnauba wax constituent, said constituent being hard at normal room temperatures but being plastic at or below the cooking temperature, so as to provide impregnation of the cooking surface with a material which prevents adhesion of the cooked material and which continuously impregnates the cooking surface for a considerable number of repeated separations with a very small loss of impregnated material upon successive cooking operations.

2. In the manufacture of a cooking appliance having a metallic surface for directly contacting food to be cooked, the process of treating the cooking surface to afford many repeated separations of the food therefrom without adhesion to the cooking surface, which process includes the application to said cooking surface of heated material in liquefied form and including a constituent which has a melting point and a hardness at room temperature substantially that of carnauba wax, said constituent being plastic at or below the cooking temperature, so as to provide impregnation of the cooking surface with a material which prevents adhesion of the cooked material and which continuously impregnates the cooking surface for a considerable number of repeated separations with a very small loss of impregnated material upon successive cooking operations.

3. In the manufacture of a cooking appliance having a metallic cooking surface for directly contacting material to be cooked, the process of treating the cooking surface to prevent said material from sticking thereto upon the application of cooking heat to said surface and to protect the cooking surface during packing, shipment and sale, which process includes subjecting said surface to a protective coating of wax-like substance which is solid at room temperature but which melts at a temperature lower than cooking temperature, whereby upon the application of cooking heat, said wax-like substance melts and treats the cooking surface to prevent such sticking, and applying a further protective coating in sheet form to said cooking surface while said wax-like substance is in a plastic state so that the wax-like substance also causes adhesion of the protective sheet upon cooling to room temperature.

KENNETH L. WOODMAN.